UNITED STATES PATENT OFFICE.

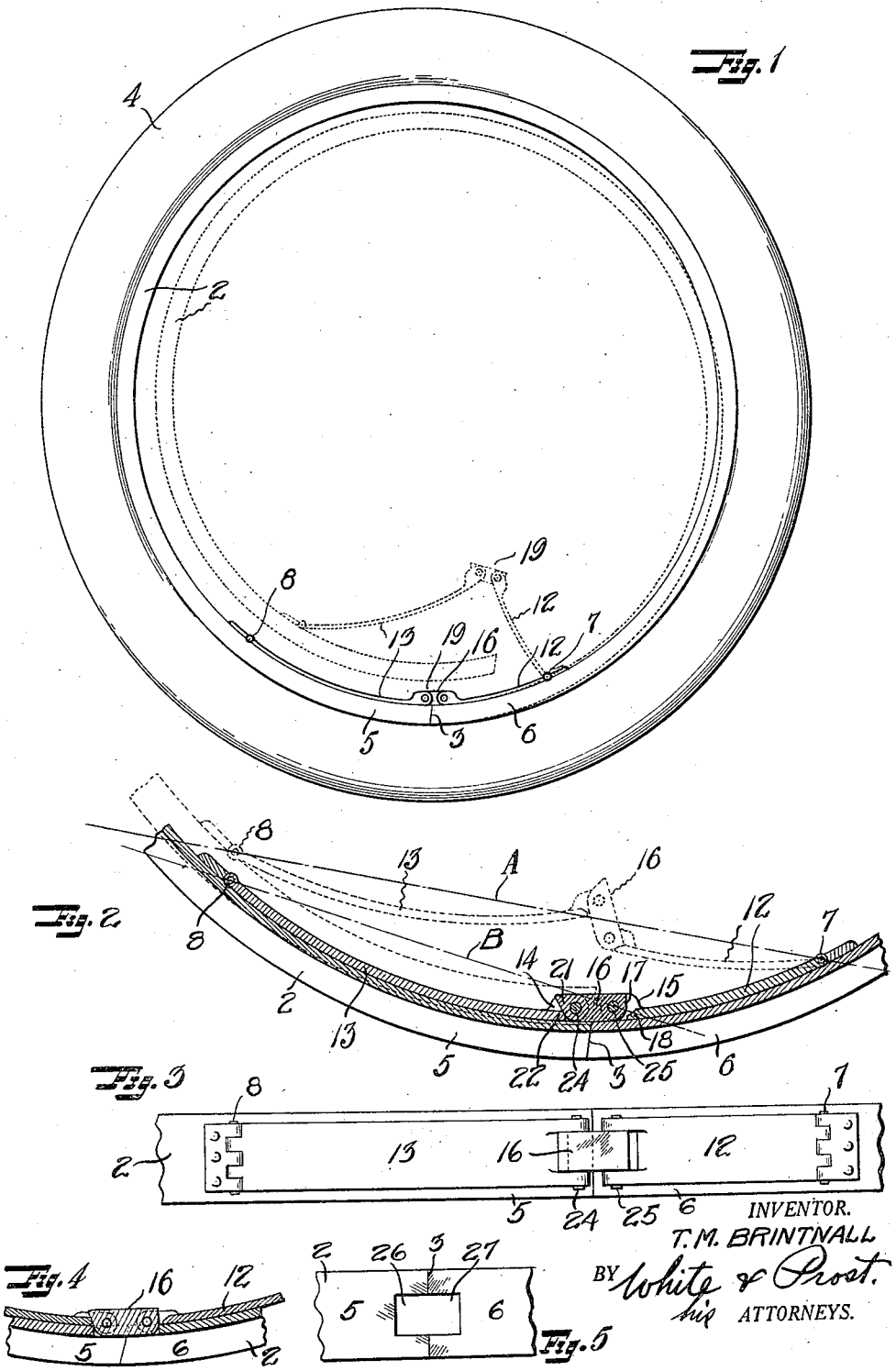

THOMAS M. BRINTNALL, OF OAKLAND, CALIFORNIA, ASSIGNOR OF ONE-FOURTH TO J. FRANK HANLY, ONE-FOURTH TO CHARLES H. HANLY, AND ONE-FOURTH TO RAYMOND E. HANLY, ALL OF OAKLAND, CALIFORNIA.

DEMOUNTABLE RIM.

1,402,142.      Specification of Letters Patent.      Patented Jan. 3, 1922.

Application filed July 22, 1919. Serial No. 312,603.

*To all whom it may concern:*

Be it known that I, THOMAS M. BRINTNALL, a citizen of the United States, and a resident of the city of Oakland, county of Alameda, and State of California, have invented a new and useful Demountable Rim, of which the following is a specification.

My invention relates to detachable and contractable rims for automobile tires.

An object of the invention is to provide a demountable rim which may be expanded to an operative position from a collapsed state without unduly stretching the tire during the expanding operation.

Another object of the invention is to provide a demountable rim which may be expanded to its operative position with a minimum of effort, but which when in said position, will normally offer a maximum resistance to the collapsing of the rim.

The invention possesses other objects and features of advantage, some of which, with the foregoing, will be set forth in the following description of the preferred forms of my invention which are illustrated in the drawings accompanying and forming part of the specification. It is to be understood that I do not limit myself to the showing made by the said drawings and description, as I may adopt variations of the preferred forms within the scope of my invention as set forth in the claims.

Referring to said drawings:

Fig. 1 is a side elevation of the rim, showing it in engagement with a tire. The collapsed position of the rim being indicated by the dotted lines.

Fig. 2 is a vertical cross sectional view on an enlarged scale of a portion of the rim. The dotted lines indicate the position of the parts shortly after the collapsing operation of the rim has commenced.

Fig. 3 is a plan view of the parts shown in Fig. 2.

Fig. 4 is a vertical cross sectional view on an enlarged scale of a portion of a modified form of the rim in its operative position.

Fig. 5 is a plan view of the rim ends of the modified form shown in Fig. 4.

Briefly stated, the rim of my invention comprises a split body which assumes a collapsed or contracted state in its inoperative position. Means operative upon the application of pressure are provided for expanding the rim to effective position, and means are also provided which co-operate with said expanding means whereby the rim may be expanded to effective position without stretching the tire and locked in said expanded position against contraction.

A detailed description of the invention follows:

The rim of my invention comprises a body 2 having one or more transverse breaks 3. In the present embodiment of the invention, the body of the rim is practically of the type described in a co-pending application filed by me on April 29, 1919, and bearing Serial Number 293,424, however any suitable body may be used, those of the type which are adapted to assume a contracted state in their inoperative position being preferable. The present body 2 is inherently substantially involute in form and assumes this shape in its inoperative or collapsed position.

Means are provided which are operative upon the application of pressure for expanding the rim from its contracted involute form to circular form in order that it may properly engage the tire 4. Pivoted to the rim adjacent the ends 5 and 6 thereof at the points 7 and 8 are links 12 and 13. The links are connected together at their free ends 14 and 15 by means which will be more fully hereinafter explained, and as indicated by the dotted lines in Figure 1, the links assume an inward position when the rim is in its collapsed state. By exerting sufficient pressure on the links in an outward direction they will expand the rim to circular form and then lie against the rim substantially in circular alinement therewith.

It will be noted that during both the contracting and expanding operation of the rim, the links must pass through a chord A intersecting the pivotal points 7 and 8, and in demountable rims of the present type, the connection between the said free ends of the links is generally such that in order to pass through said chord, the links must approach and recede from a position in which their longitudinal axes are alined. In other words, while the rim is undergoing a change of form, the chord usually assumes a length which causes the rim to attain an expansion considerably greater than that actually necessary for the operative position of the rim. This condition causes stretching of the tire, sets up severe stresses therein, and requires a considerable force to effect expansion of the rim. In accordance with my invention, means are provided for expanding the rim to operative position with an expenditure of a minimum amount of energy, and without stretching the tire. Connecting the free ends 14 and 15 of the links 12 and 13, is an intermediate or connecting link 16, the three links forming, in effect, a double elbowed toggle 19. In this manner, when the rim is being expanded, the intermediate link will assume an inclined position and enable the links 12 and 13 to pass through the chord A without abnormally expanding the rim. The link 16 is formed with an integral projection 17 which is arranged to engage a shoulder 18 formed on the link 12. The projection and shoulder act to limit the relative movement of the intermediate link and link 12 in order that the rim may be properly expanded and cause each of the links to become circularly alined and in contact with the rim when the rim is in its expanded position.

It is very desirable, from a standpoint of safety, that the rim be locked against collapsion, when an inflated tire engages the rim. With this end in view I have provided means without the addition of any more parts, for normally holding the rim locked against collapsion when it is in its effective position. Formed on said intermediate link is a second projection 21 which is arranged to engage a shoulder 22 on the link 13. The projection 21 and shoulder 22 are preferably positioned in a manner which will not permit the links 16 and 13 to break outwardly or the links 12 and 16 inwardly when the rim is in its expanded position. Likewise it will be seen by reference to Fig. 2 of the drawings, that the links 12 and 16 cannot break outwardly or the links 13 and 16 inwardly when the rim is in said position, since the pivotal point 24 of the links 16 and 13 lies on the outer side of a chord B intersecting the point 8 of the rim and pivot 25 of the links 16 and 12. If pressure is exerted on the rim tending to collapse it, the links will endeavor to pass through the chord A while the links are in the full extended position. Any effort to collapse the rim by causing the links to pass through the chord A in this manner meets with the full resistance of both the rim and tire, thus practically locking the rim against normal collapsion.

When it is desired to release the tire from the rim or collapse the rim, it is only necessary to hold the link 12 firmly against the side of the rim while an extraneous force in an inward direction is imparted to the rim adjacent the end 5 thereof. The slight resiliency of the link 13 is then sufficient to allow the links 16 and 13 to pass through the chord B, thereby enabling the intermediate link 16 to assume its inclined positioned, and permitting the collapsion of the rim and disengagement thereof from the tire.

In Figures 4 and 5, I have shown a slightly modified construction. In this form of the invention the rim ends are provided with recesses 26 and 27 in which the link 16 is adapted to seat when the rim is in its operative position. This construction not only makes a compact structure, but prevents lateral displacement of the rim ends.

I claim:

1. In combination with a split demountable rim adapted to assume a collapsed state in its inoperative position, a double elbowed toggle having its outer ends connected to the end portions of the rim, one of the toggle links having a limited movement with respect to the toggle and disposed to overlap the rim.

2. A demountable rim adapted to assume a contracted state in its inoperative position, comprising a split body, and means operative upon the application of pressure for expanding the rim to operative position, said expanding means being arranged to offer a minimum resistance to the expansion of the rim when the rim is in a contracted position and to normally offer a maximum resistance to the contraction of the rim when the rim is in its expanded position and comprising end links and an intermediate double knuckle link all adapted to bear against the rim body.

3. A demountable rim adapted to assume a contracted state in its inoperative position, comprising a split body portion, links pivoted to the body portion adjacent the ends thereof and opening to acute angles therewith, and a knuckle, connecting link to which each of said first named links are pivoted for a limited relative movement and overlapping the rim.

4. A demountable rim adapted to assume a contracted state in its inoperative position, comprising a split body, links pivoted to said body adjacent the ends thereof, an intermediate connecting link overlapping the rim and to which each of said first links are pivoted for a limited relative movement, said links being operative upon the application of pressure to expand the rim to its operative position and to form an arc when the rim is in said operative position concentric with the rim, said links being arranged during said expanding operation to pass through the chord intersecting the ends of said arc substantially without varying the length of said chord, the rim being expanded by swinging the intermediate links past a chord between a pivot at one end and the pivot of another link.

5. A demountable rim adapted to assume a contracted state when demounted, comprising a split ring and means for expanding the ring including a pair of links pivoted at remote ends to the ring at points on opposite sides of the split; the links being of slightly less length than a chord between their pivots, and an intermediate expanding link connecting the adjacent link ends, and operative when swung past the chord between one of its pivots and a pivot of one of the links to expand the ring, all said links adapted to overlap the adjacent ring ends.

6. A demountable rim, comprising an inherently substantially involute rim adapted to be expanded to circular form, and a triple link toggle connecting the rim adjacent the ends thereof and overlapping the meeting ends of the rim.

7. A demountable rim adapted to assume a contracted state in its inoperative position, comprising a transversely split body having recessed transverse meeting edges, links pivoted to said body adjacent said ends, and a connecting link to which each of said first named links is pivoted and arranged to seat in said recesses in the expanded position of the rim to prevent lateral displacement of the rim ends.

In testimony whereof, I have hereunto set my hand at Oakland, California, this 8th day of July, 1919.

THOMAS M. BRINTNALL.

In presence of—
J. B. GARDNER,
L. L. M. SALSBURY.